(12) United States Patent
Isokawa et al.

(10) Patent No.: US 10,200,565 B2
(45) Date of Patent: Feb. 5, 2019

(54) IMAGE FORMING SYSTEM AND READING DEVICE

(71) Applicant: Konica Minolta, Inc., Chiyoda-ku, Tokyo (JP)

(72) Inventors: Hiroshi Isokawa, Hino (JP); Kenji Kawatsu, Kodaira (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/708,756

(22) Filed: Sep. 19, 2017

(65) Prior Publication Data
US 2018/0084145 A1    Mar. 22, 2018

(30) Foreign Application Priority Data

Sep. 21, 2016  (JP) ................................ 2016-183586

(51) Int. Cl.
| | |
|---|---|
| *H04N 1/387* | (2006.01) |
| *G03G 15/22* | (2006.01) |
| *H04N 1/00* | (2006.01) |
| *H04N 1/04* | (2006.01) |
| *H04N 1/12* | (2006.01) |

(52) U.S. Cl.
CPC ......... *H04N 1/3878* (2013.01); *G03G 15/228* (2013.01); *H04N 1/00814* (2013.01); *H04N 1/0432* (2013.01); *H04N 1/126* (2013.01)

(58) Field of Classification Search
CPC ..... H04N 1/0432; H04N 1/113; G03G 15/041
See application file for complete search history.

(56) References Cited

U.S. PATENT DOCUMENTS

| | | | | |
|---|---|---|---|---|
| 4,839,699 A | * | 6/1989 | Hosaka | G03G 15/04018 355/55 |
| 6,005,587 A | * | 12/1999 | Takahashi | G06T 3/40 715/733 |
| 6,219,463 B1 | * | 4/2001 | Hyodo | G06K 7/10722 358/486 |
| 6,384,942 B1 | * | 5/2002 | Tamamura | H04N 1/1013 358/475 |
| 6,704,461 B1 | * | 3/2004 | Yamamoto | H04N 1/00681 382/298 |
| 9,645,521 B2 | * | 5/2017 | Kodama | B41J 2/47 |

(Continued)

FOREIGN PATENT DOCUMENTS

JP    2011-180084 A    9/2011

*Primary Examiner* — Ted Barnes
(74) *Attorney, Agent, or Firm* — Buchanan Ingersoll & Rooney PC

(57) ABSTRACT

An image forming system includes an image forming device, a reading device and a hardware processor. The image forming device includes an image former that forms an image on a sheet. The reading device includes a line sensor and a lens unit. The line sensor reads the sheet with the image formed, thereby obtaining a read image. The lens unit includes a plurality of lenses and forms an image of the sheet on the line sensor. The hardware processor identifies a sheet region of the sheet in the read image, and corrects a magnification of each subregion in a main scanning direction of the sheet region according to a characteristic of a portion in the main scanning direction of the lens unit, the portion having being used in forming an image of the subregion on the line sensor.

13 Claims, 10 Drawing Sheets

(56) References Cited

U.S. PATENT DOCUMENTS

| | | | |
|---|---|---|---|
| 2003/0164992 A1* | 9/2003 | Sakaguchi | H04N 1/00002 358/475 |
| 2005/0036799 A1* | 2/2005 | Tomita | G03G 15/50 399/49 |
| 2009/0135243 A1* | 5/2009 | Yamazaki | B41J 2/473 347/254 |
| 2011/0084996 A1* | 4/2011 | Hirato | B41J 2/0451 347/10 |
| 2011/0205604 A1* | 8/2011 | Imaizumi | H04N 1/0402 358/498 |
| 2013/0083107 A1* | 4/2013 | Nishikawa | B41J 2/0451 347/10 |
| 2013/0278945 A1* | 10/2013 | Ono | G03G 15/041 358/1.2 |
| 2014/0177010 A1* | 6/2014 | Lee | H04N 1/00798 358/474 |
| 2015/0277307 A1* | 10/2015 | Goto | G03G 15/5058 399/49 |
| 2015/0338764 A1* | 11/2015 | Kodama | B41J 2/47 347/118 |
| 2016/0014290 A1* | 1/2016 | Mizuno | H04N 1/3875 358/1.2 |
| 2017/0052468 A1* | 2/2017 | Omura | G03G 15/0131 |
| 2017/0214828 A1* | 7/2017 | Araki | H04N 1/00068 |

* cited by examiner

| No. | TEMPERATURE[°C] | CORRECTION COEFFICIENT |
|---|---|---|
| 1 | 10 | 1.075 |
| 2 | 15 | 1.05 |
| 3 | 20 | 1.025 |
| 4 | 25 | 1 |
| 5 | 30 | 0.975 |
| 6 | 35 | 0.95 |
| 7 | 40 | 0.925 |
| 8 | 45 | 0.9 |
| 9 | 50 | 0.875 |
| 10 | 55 | 0.85 |
| 11 | 60 | 0.825 |

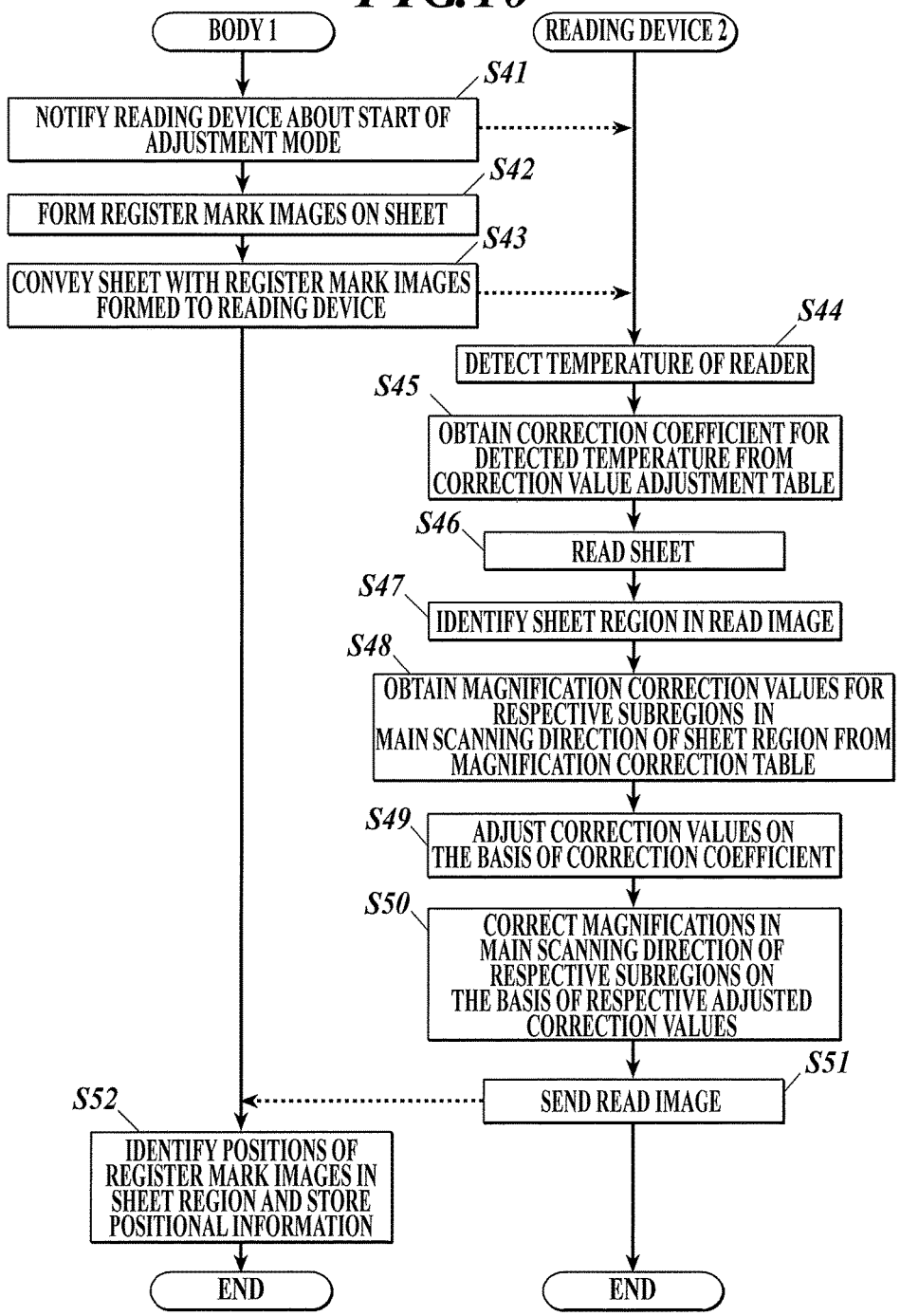

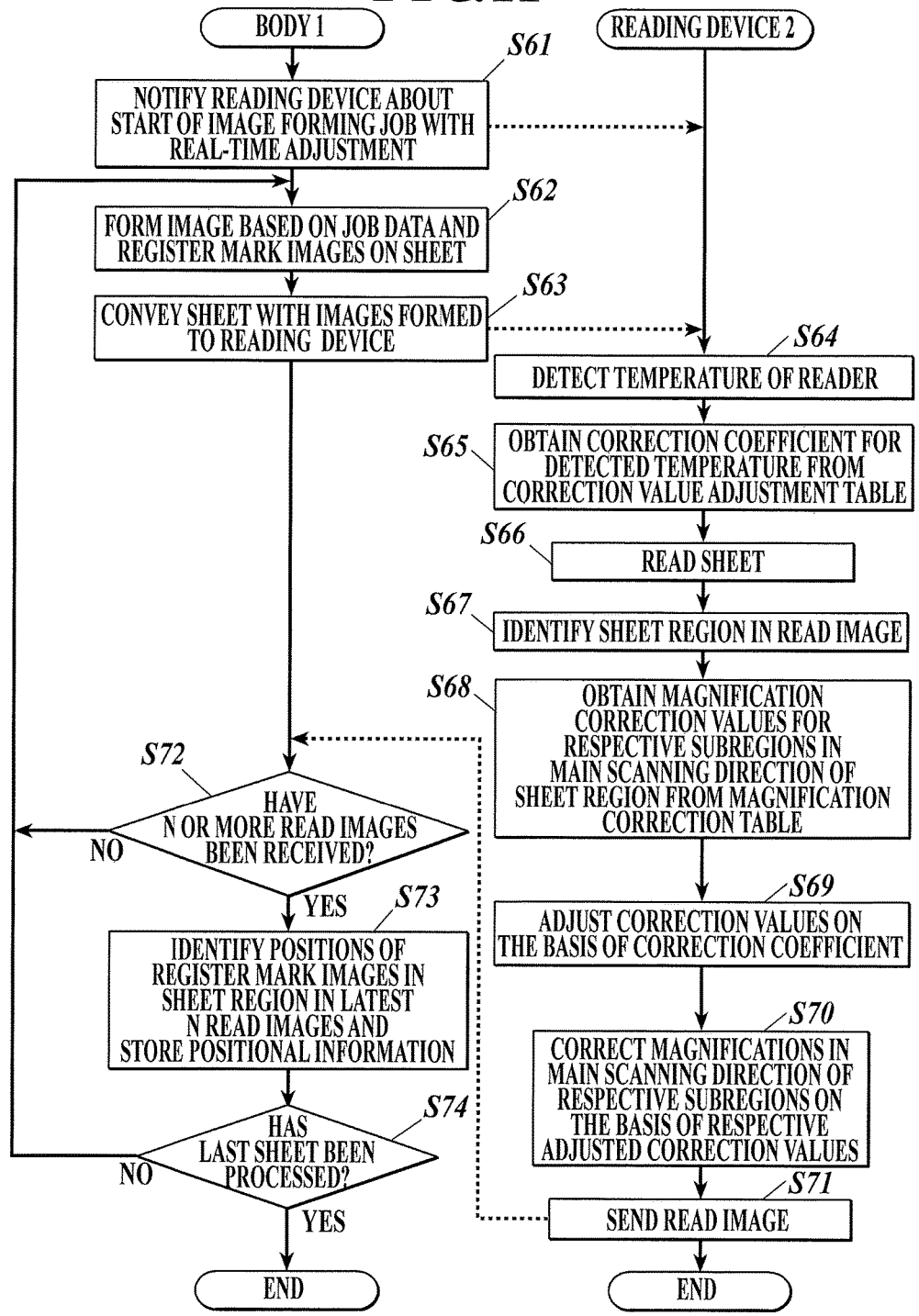

IMAGE FORMING SYSTEM AND READING DEVICE

CROSS-REFERENCE TO RELATED APPLICATIONS

The present U.S. Patent Application claims a priority under the Paris Convention of Japanese Patent Application No. 2016-183586 filed on Sep. 21, 2016, the entire disclosure of which, including the description, claims, drawings and abstract, is incorporated herein by reference in its entirety.

BACKGROUND

1. Technological Field

The present invention relates to an image forming system and a reading device.

2. Description of the Related Art

There has been a method of: reading a print sheet output from an image forming device, with a reading device disposed at the rear of the image forming device; analyzing the obtained read image; and, if there is an error in the position of the image on the sheet, giving feedback to image forming in the image forming device. In such a case, in order to correct the magnification in the main scanning direction of the read image, there has been a method of: reading the full width of the sheet with the reading device; calculating the distance of the full width of the sheet; and correcting the magnification on the basis of the calculated distance.

By the way, in the reading device, after mirrors and lenses repeatedly reflect and gather flux of light from the sheet, a lens unit leads the light to a CCD (Charge Coupled Device) line sensor as an imaging element. However, owing to distortion of the lenses, degree of accuracy of relative position of the lens unit and the line sensor in assembling and/or the like, the magnification in the main scanning direction of the read image partially varies, which is the actual circumstances. In general, the magnification of a lens tends to increase from the center to the outer side thereof. Hence, the above-described conventional method of: reading the full width of the sheet with the reading device; calculating the distance of the full width of the sheet; and correcting the magnification in the main scanning direction of the read image on the basis of the calculated distance causes the following problems (1) to (4).

(1) Owing to individual difference of lens units and/or degree of accuracy of relative position of a lens unit and a line sensor in assembling, difference is generated in the magnification, depending on a section in the main scanning direction of a read image(s). This difference in sectional magnifications in the main scanning direction is unconsidered.

(2) In order that the reading device should handle all readable sizes of sheets, it has a reading range to read the region of a sheet of the maximum size. However, if the target is a sheet of a small size, and magnification correction is performed with respect to the full reading range, processing time unnecessarily becomes long.

(3) Depending on paper feeding and/or paper conveyance of the image forming device, where sheets are conveyed varies in the main scanning direction. This causes change in the magnification(s) because images are read by portions of the lens unit having different lens characteristics, sheet by sheet. However, magnification correction taking this point into account is not performed.

(4) If a sheet is skewed when read, the lens range of the lens unit used for reading the top through the bottom of the sheet changes. This causes change in the magnification, depending on a part of the sheet (see FIG. 8). However, magnification correction taking this point into account is not performed.

For example, there is described in Japanese Patent Application Publication No. 2011-180084 an art for correcting lens distortion of a two-dimensional camera. More specifically, it is described that a lens distortion correction tool 11 provided with dot marks 12 arranged to be a matrix is placed on a conveyor of a component mounting machine, the lens distortion correction tool 11 is imaged from the above by a camera, differences between the identified positions acquired by image processing on the image and theoretical positions of the dot marks 12 of the lens distortion correction tool 11 are calculated and stored in a storage medium as distortion amounts of the respective positions of the dot marks 12 of the image, and afterward, a component mounting substrate placed on the conveyor during operation of the component mounting machine is imaged from the above by the camera, and the identified position of an identification target portion of the component mounting substrate acquired by image processing on the image is corrected by the distortion amount of the dot mark position corresponding to the identification target portion, the dot mark position being read from the storage medium.

However, the reading device used for feedback control of an image forming device needs to read sheets conveyed from the image forming device without slowing down the printing speed of the image forming device. Hence, a line sensor needs to be used, and therefore the art for correcting lens distortion of a two-dimensional camera described in Japanese Patent Application Publication No. 2011-180084 cannot be applied thereto.

SUMMARY

Objects of the present invention include appropriately correcting, according to the conveyance state of a sheet(s) of paper, difference in sectional magnifications in the main scanning direction of a read image(s) due to characteristics of a lens unit of a reading device.

In order to achieve at least one of the abovementioned objects, according to a first aspect of the present invention, there is provided an image forming system including: an image forming device including an image former that forms an image on a sheet; and a reading device including: a line sensor that reads the sheet with the image formed by the image forming device, thereby obtaining a read image; and a lens unit including a plurality of lenses that forms an image of the sheet on the line sensor; and a first hardware processor that: identifies a sheet region of the sheet in the read image obtained by the line sensor; and corrects a magnification of each subregion in a main scanning direction of the identified sheet region according to a characteristic of a portion in the main scanning direction of the lens unit, the portion having being used in forming an image of the subregion on the line sensor.

In order to achieve at least one of the abovementioned objects, according to a second aspect of the present invention, there is provided a reading device including: a line sensor that reads a sheet with an image formed, thereby obtaining a read image; a lens unit including a plurality of lenses that forms an image of the sheet on the line sensor;

and a hardware processor that: identifies a sheet region of the sheet in the read image obtained by the line sensor; and corrects a magnification of each subregion in a main scanning direction of the identified sheet region according to a characteristic of a portion in the main scanning direction of the lens unit, the portion having been used in forming an image of the subregion on the line sensor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 10 shows flow of processing performed by the body and the reading device when the start button is pressed in the adjustment mode in a second embodiment; and FIG. 11 shows flow of processing performed by the body and the reading device when an image forming job is performed in the state in which real-time adjustment is set in the second embodiment.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

<Configuration of Image Forming System 100>

Figure 1:
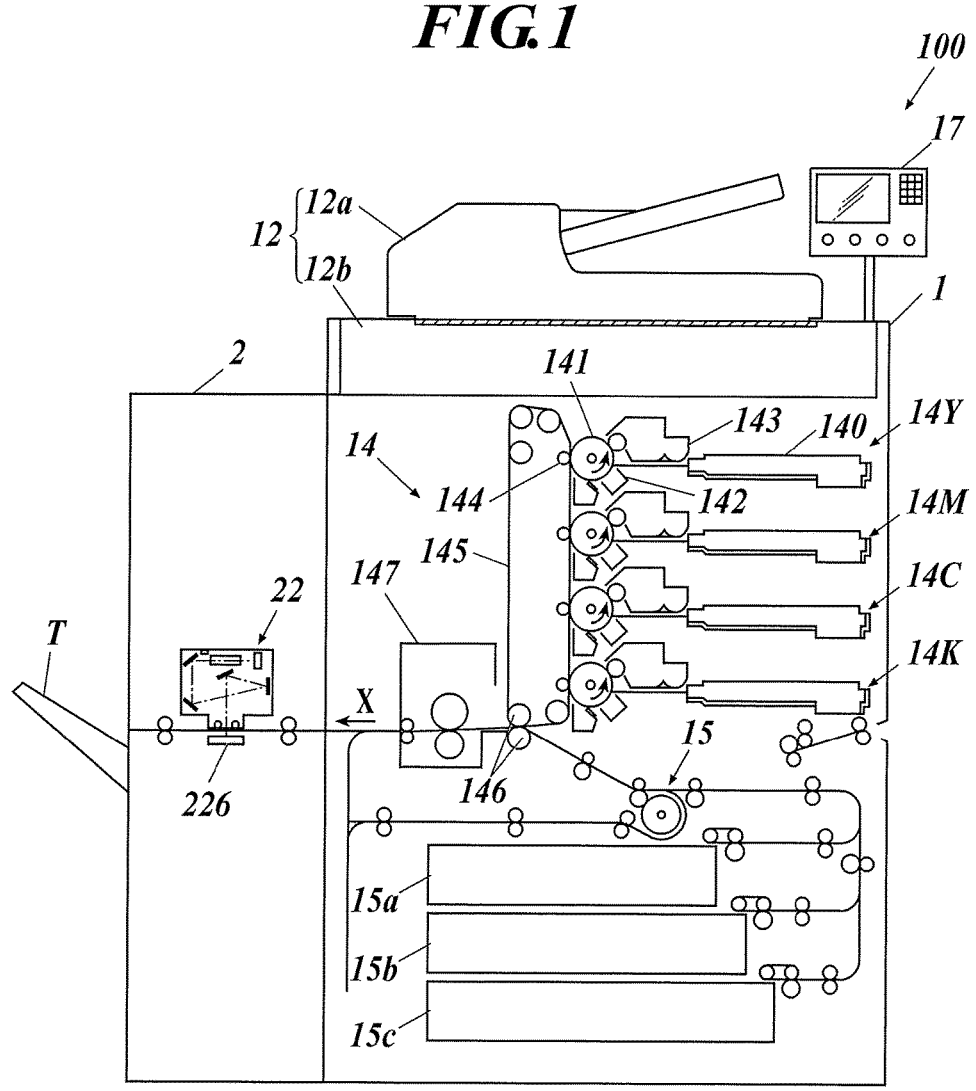
FIG. 1 shows an example of the overall configuration of an image forming system.
Figure 2:
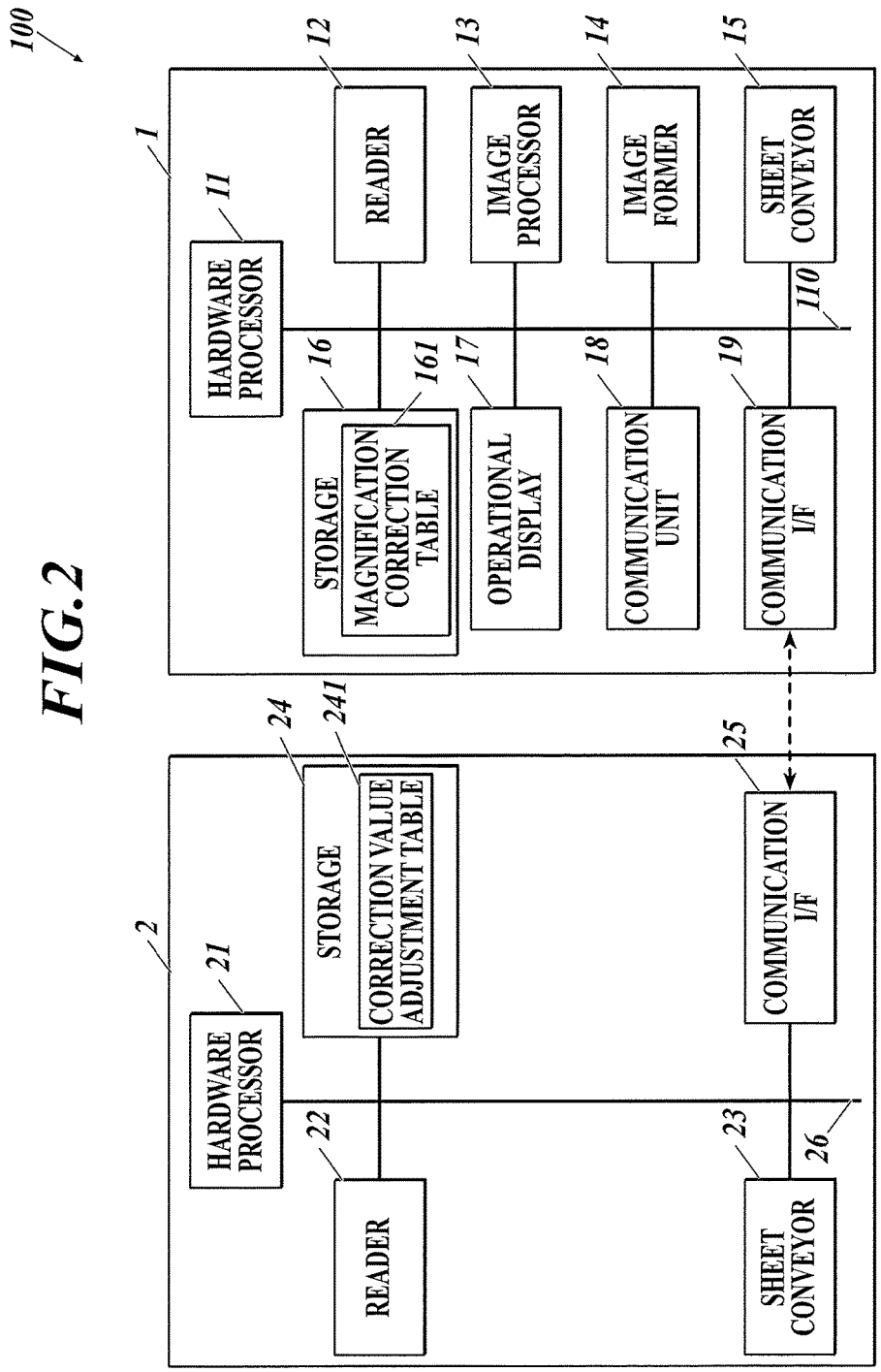
FIG. 2 is a block diagram showing the main components of control systems of an image forming device (body) and a reading device.

FIG. 1 shows an example of the overall configuration of an image forming system 100 according to a first embodiment. FIG. 2 shows the main components of control systems of a body 1 and a reading device 2 of the image forming system 100.

As shown in FIG. 1, the image forming system 100 includes the image forming device 1 (i.e. "body 1") and the reading device 2. The reading device 2 is disposed downstream of the body 1 in a direction in which sheets of paper are conveyed (direction indicated by an arrow X in FIG. 1; hereinafter called "sheet conveying direction).

<Configuration of Body 1>

The body 1 is a color image forming device making use of an art of electrophotographic process.

As shown in FIG. 2, the body 1 includes a hardware processor 11, a reader 12, an image processor 13, an image former 14, a sheet conveyor 15, a storage 16, an operational display 17, a communication unit 18 and a communication I/F 19. These components are connected to one another via a bus 110.

The hardware processor 11 includes a CPU (Central Processing Unit) and a RAM (Random Access Memory). The CPU of the hardware processor 11 reads a system program and various processing programs stored in the storage 16, opens the read programs on the RAM, and performs centralized control on the components of the body 1 and operation of the reading device 2 by following the opened programs.

The reader 12 includes an auto document feeder (ADF) 12a and a scanner 12b.

The auto document feeder 12a sends documents placed on a document tray onto a platen glass by conveying the documents with a conveyance mechanism.

The scanner 12b includes: an exposure-scanning unit including light sources and mirrors; an optical system (lens unit); and a CCD line sensor. The scanner 12b optically scans, with the exposure-scanning unit, a document(s) conveyed from the auto document feeder 12a onto the platen glass or a document(s) placed on the platen glass, forms, with the lens unit, an image of the reflected light from the document on the photosensitive surface of the CCD line sensor, thereby generating image data, and outputs the image data to the image processor 13.

The image processor 13 performs various types of image processing, which is exemplified by RIP (on the image data input from the communication unit 18), gamma adjustment, screening, density balance adjustment and color conversion, on the image data input from the reader 12 or the communication unit 18, thereby generating image data of respective colors of Y (yellow), M (magenta), C (cyan) and K (black), and outputs the Y, M, C and K image data to the image former 14.

The image former 14 forms, using electrophotography, an image(s) on a sheet(s) conveyed by the sheet conveyor 15 on the basis of the image data input from the image processor 13.

The image former 14 includes: four image forming units 14Y, 14M, 14C and 14K for the respective colors of Y, M, C and K ingredients; an intermediate transfer belt 145; a pair of secondary transfer rollers 146; and a fixing unit 147 (see FIG. 1). The image forming units 14Y, 14M, 14C and 14K have the same configuration. For convenience of illustration, the same/corresponding components are indicated by the same reference number(s), and when they need to be distinguished, Y, M, C or K is added to the reference number(s). In FIG. 1, only the reference numbers of the components of the image forming unit 14Y, which is for Y ingredient, are shown, and the reference numbers of the components of the other image forming units 14M, 14C and 14K are omitted. Each of the image forming units 14Y, 14M, 14C and 14K includes an exposure unit 140, a photoreceptor 141, a charger 142, a developing unit 143 and a primary transfer roller 144 (see FIG. 1).

The exposure unit 140 includes a laser source, and, on the basis of the image data output from the image processor 13, emits laser light onto the photoreceptor 141 charged by the charger 142 so as to expose the photoreceptor 141 to the laser light, thereby forming an electrostatic latent image(s) on the photoreceptor 141.

The developing unit 143 supplies a toner of a predetermined color (Y, M, C or K) onto the photoreceptor 141 exposed to the light so as to develop the electrostatic latent image formed on the photoreceptor 141, thereby forming a toner image.

The primary transfer roller 144 is disposed to face the photoreceptor 141. To the primary transfer roller 144, a primary transfer bias having a polarity opposite to that of the toner is applied. The primary transfer roller 144 presses a predetermined point on the intermediate transfer belt 145 to the photoreceptor 141, thereby transferring the toner image formed on the photoreceptor 141 to the intermediate transfer belt 145 (primary transfer). The primary transfer rollers 144Y, 144M, 144C and 144K press the predetermined point on the intermediate transfer belt 145 to their respective photoreceptors 141 in turn, so that a color toner image, which is composed of layers of the respective colors superimposed, is written on the intermediate transfer belt 145.

The intermediate transfer belt 145 is a semi-conductive endless belt wound around and supported by a plurality of rollers in such a way as to be rotatable, and is driven to rotate as the rollers rotate and conveys the written color toner image to the secondary transfer rollers 146.

To the secondary transfer rollers 146, a bias having a polarity opposite to that of the toners is applied. The secondary transfer rollers 146 hold and convey a sheet conveyed thereto, thereby transferring the color toner image written on the intermediate transfer belt 145 onto the sheet (secondary transfer).

The fixing unit 147 heats and presses the color toner image transferred onto the sheet, thereby fixing the color toner image to the sheet.

The sheet conveyor 15 includes: a conveyor belt disposed on a sheet conveyance path; conveying rollers including a resist roller; and a not-shown motor that drives these, and, under the control of the hardware processor 11, feeds and conveys sheets stored in any of paper feeder trays 15a to 15c along the sheet conveyance path so that images can be formed on the sheets.

The storage 16 is constituted of a nonvolatile memory or the like, and stores therein the system program executable by the body 1, the various processing programs executable on the system program, data used when the various processing programs are executed, data of processing results of arithmetic processing performed by the hardware processor 11, and so forth.

In this embodiment, the storage 16 stores therein a magnification correction table 161. The magnification correction table 161 is a table in which correction values are stored. The correction values are to correct difference in magnifications of subregions (hereinafter may be called "sectional magnifications") in the main scanning direction of a read image(s) due to distortion of a lens unit 223 of the reader 22 of the reading device 2 and/or degree of accuracy of relative position of a lens unit and a CCD line sensor in assembling. In the magnification correction table 161, the correction values for magnifications of subregions in the main scanning direction of a read image(s) are correlated and stored with portions in the main scanning direction of a CCD line sensor 224. The correction values are obtained, for example, by: at the time of assembling the reader 22, measuring characteristics of respective subregions (portions) in the main scanning direction of the lens unit 223, which is installed in the reader 22; and calculating the correction values for magnifications of respective subregions in the main scanning direction of a read image(s) on the basis of the measured characteristics of the respective subregions (portions) in the main scanning direction of the lens unit 223.

Figure 3:
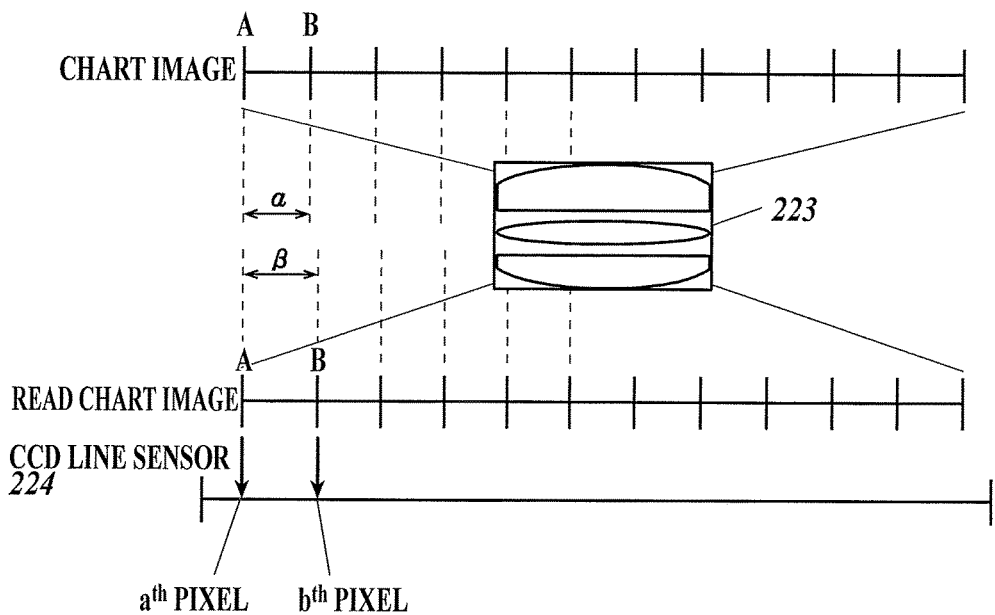
FIG. 3 schematically shows an example of a method for calculating correction values stored in a magnification correction table.

FIG. 3 schematically shows an example of the method for calculating the correction values stored in the magnification correction table 161. An example of the method is, for example, when the lens unit 223 is installed in the reader 22, reading, with the reader 22, a chart image that is marked off every predetermined interval (e.g. an interval of 10 mm) in the main scanning direction, and calculating a magnification correction value for each subregion in the main scanning direction of the read chart image obtained by the reader 22 on the basis of a ratio of distance between marks in the chart image to distance between their corresponding marks in the read chart image. For example, as shown in FIG. 3, if distance from mark A to mark B of the chart image is $\alpha$, distance from mark A to mark B of the read chart image is $\beta$, and an image of the mark A to the mark B of the chart image is formed on the $a^{th}$ pixel to the $b^{th}$ pixel of the CCD line sensor 224, the magnification correction value for a subregion of a read image (or the read chart image) corresponding to the $a^{th}$ pixel to the $b^{th}$ pixel is calculated as $\alpha/\beta$. Then, the portion (e.g. the $a^{th}$ pixel to the $b^{th}$ pixel) for the subregion in the main scanning direction of the read image is correlated and stored with the magnification correction value (e.g. $\alpha/\beta$) for the subregion in the magnification correction table 161. That is, difference in sectional magnifications in the main scanning direction of a read image(s), obtained by the reader 22, due to characteristics of respective portions in the main scanning direction of the lens unit 223 can be corrected by correcting the sectional magnifications in the main scanning direction of the read image(s) with correction values for the respective subregions.

The operational display 17 is constituted of an LCD (Liquid Crystal Display) or the like, and displays thereon various operation buttons, the status of the device, the operating state of each function, and so forth on its display screen in response to commands of display signals input from the hardware processor 11. The display screen of the LCD is covered with a pressure-sensitive (resistive) touch-screen that is configured such that transparent electrodes are arranged to be grid-like, whereby the operational display 17 detects XY coordinates of points pressed with a finger, a touch pen or the like in the form of voltage values, and outputs signals of the detected points to the hardware processor 11 as operation signals. Further, the operational display 17 is provided with number buttons and various operation buttons including a start button, and outputs operation signals made by operations on the buttons to the hardware processor 11.

The communication unit 18 includes a modem, a LAN adaptor and a router, and communicates with external devices such as a PC (Personal Computer) connected to a communication network such as a LAN (Local Area Network), a WAN (Wide Area Network) or the like.

The communication I/F 19 is an interface for communication connection with the reading device 2.

<Configuration of Reading Device 2>

The reading device 2 obtains read images by reading sheets with images formed by the body 1. As shown in FIG. 2, the reading device 2 includes a hardware processor 21, a reader 22, a sheet conveyor 23, a storage 24 and a communication I/F 25. These components are connected to one another via a bus 26.

The hardware processor 21 includes a CPU (Central Processing Unit) and a RAM (Random Access Memory).

The CPU of the hardware processor 21 reads a system program and various processing programs stored in the storage 24, opens the read programs on the RAM, and performs centralized control on operation(s) of the components of the reading device 2 by following the opened programs.

The reader 22 reads sheets (sheets with images formed) conveyed from the body 1 to a reading location L, and outputs the read images to the hardware processor 21.

Figure 4:
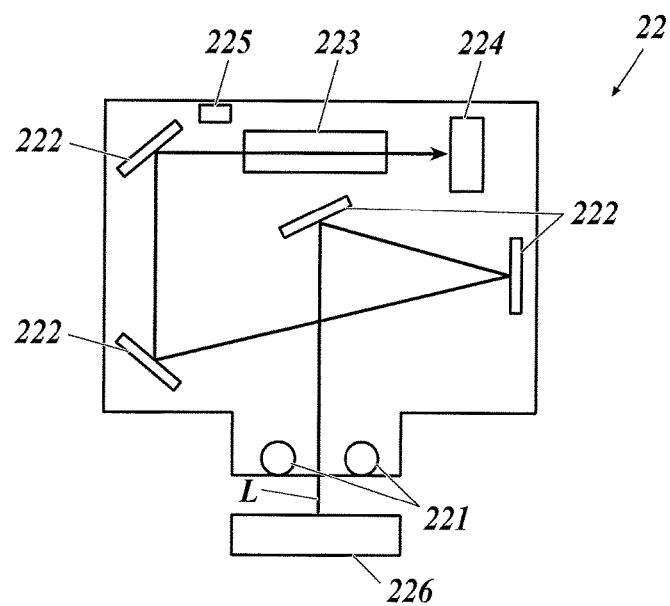
FIG. 4 shows a schematic configuration example of a reader of the reading device shown in FIG. 2.

FIG. 4 shows a schematic configuration example of the reader 22. As shown in FIG. 4, the reader 22 includes light sources 221, mirrors 222, and the lens unit 223 constituted of a plurality of lenses and the CCD line sensor 224, which are mentioned above.

Figure 5:
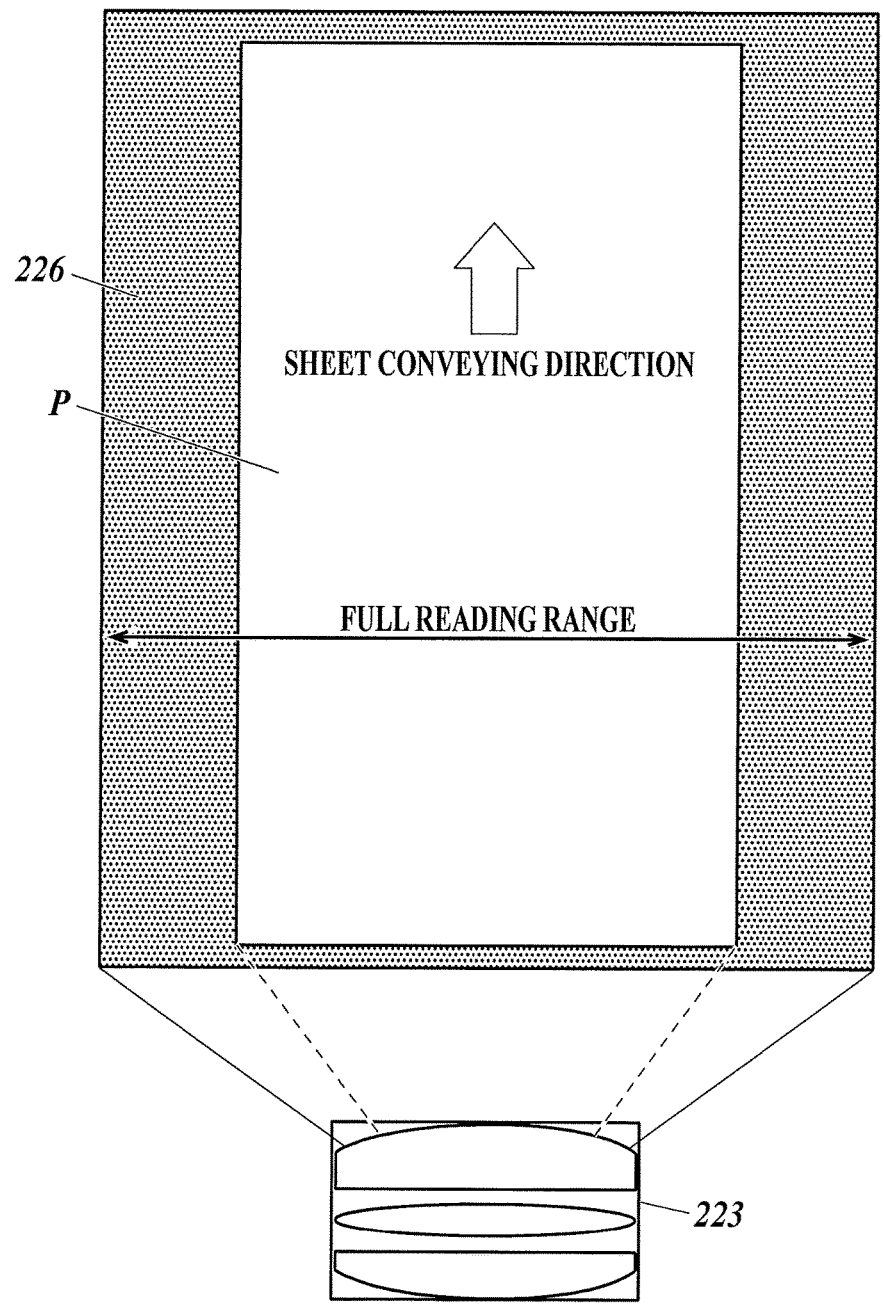
FIG. 5 shows a reading range of a CCD line sensor.

The reader 22 optically scans a sheet(s) conveyed from the body 1 to the reading location L, and, with the lens unit 223, forms an image of the reflected light from the sheet on the photosensitive surface of the CCD line sensor 224 and performs photoelectric conversion, thereby generating a read image. The CCD line sensor 224 is a color line sensor that can read a range wider than the size in the width direction (direction at right angles to the sheet conveying direction, i.e. the main scanning direction) of a sheet(s) as shown in FIG. 5. The CCD line sensor 224 reads a sheet line by line while the sheet is being conveyed, and hence can read a sheet(s) without slowing down the image forming speed of the body 1.

In the reader 22, which is in the shape of a case, a temperature sensor 225 that detects temperature of the reader 22 is disposed.

Further, a black background member 226 is disposed to face the reader 22 across the sheet conveyance path. FIG. 5 shows an example of a read image obtained by the reader 22 reading a sheet. As shown in FIG. 5, the side edges of the sheet can be easily identified on the basis of the difference in color between the sheet (indicated by "P" in FIG. 5) and the background member 226 in the read image.

The sheet conveyor 23 includes conveying rollers, a conveyor belt and a drive source for these, and conveys, along the sheet conveyance path, sheets conveyed from the body 1.

The storage 24 is constituted of a nonvolatile memory or the like, and stores therein the system program executable by the reading device 2, the various processing programs executable on the system program, data used when the various processing programs are executed, data of processing results of arithmetic processing performed by the hardware processor 21, and so forth.

Figure 6:
FIG. 6 shows an example of a correction value adjustment table.

In this embodiment, the storage 24 stores therein a correction value adjustment table 241. The lens unit 223 of the reader 22 expands by heat when the temperature increases, and causes change in a read image(s) in the main scanning direction. In the correction value adjustment table 241, as shown in FIG. 6, correction coefficients are stored. The correction coefficients are to adjust correction values for sectional magnifications in the main scanning direction of a read image(s) according to the temperature of the reader 22.

The communication I/F 25 is an interface for communication connection with the body 1.

<Operation of Image Forming System 100>

Next, operation of the image forming system 100 is described.

Figure 7:
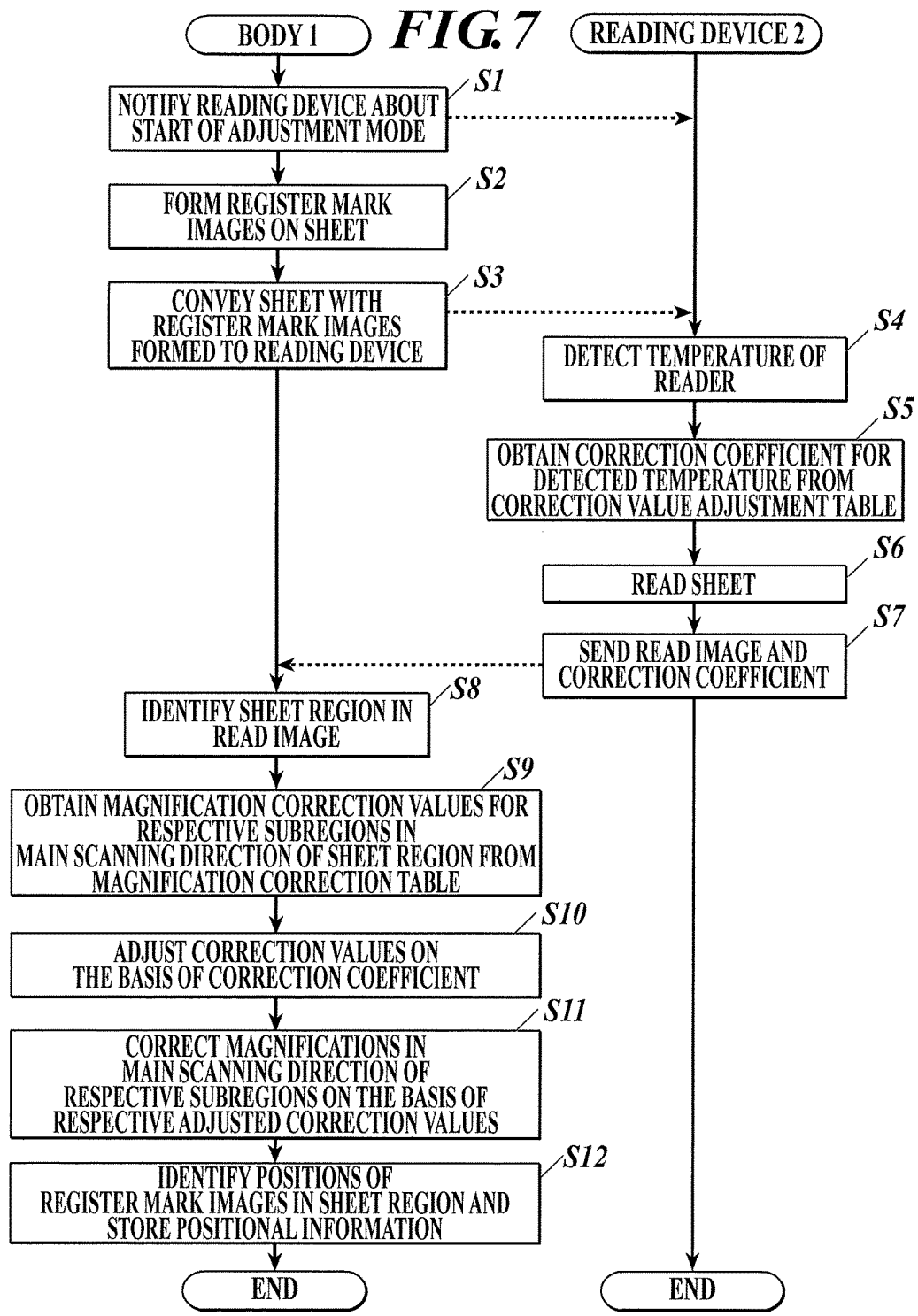
FIG. 7 shows flow of processing performed by the body and the reading device when a start button is pressed in an adjustment mode in a first embodiment.

FIG. 7 is a flowchart showing the flow of processing performed by the body 1 and the reading device 2 when an adjustment mode is selected and the start button is pressed on the operational display 17. The adjustment mode is a mode to adjust an image forming position in the image former 14 before execution of an image forming job. The process (steps) on the body 1 side shown in FIG. 7 is performed by the hardware processor 11 in cooperation with the program(s) stored in the storage 16, and the process (steps) on the reading device 2 side shown in FIG. 7 is performed by the hardware processor 21 in cooperation with the program(s) stored in the storage 24.

First, the hardware processor 11 notifies the reading device 2 about start of the adjustment mode through the communication I/F 19 (Step S1).

Next, the hardware processor 11 causes the sheet conveyor 15 to feed a sheet and causes the image former 14 to form register mark images on the sheet as position adjustment images (Step S2). The register mark images are images of cross marks formed at the four corners of the maximum printable region of the image former 14, for example.

Next, the hardware processor 11 causes the sheet conveyor 15 to convey the sheet with the register mark images formed to the reading device 2 (Step S3).

When receiving the sheet with the register mark images formed from the body 1 after receiving the notification of the start of the adjustment mode therefrom, the hardware processor 21 of the reading device 2 obtains a detection result of the temperature of the reader 22 from the temperature sensor 225 (Step S4), and obtains a correction coefficient for the surrounding temperature of the lens unit 223 by referring to the correction value adjustment table 241 stored in the storage 24 (Step S5).

Next, the hardware processor 21 of the reading device 2 causes the reader 22 to read the sheet, thereby obtaining a read image (Step S6), and sends the obtained read image and the correction coefficient obtained in Step S5 to the body 1 through the communication I/F 25 (Step S7). The read sheet is ejected to a paper output tray T by the sheet conveyor 23.

When receiving the read image and the correction coefficient through the communication I/F 19, the hardware processor 11 of the body 1 identifies the sheet region in the received read image (Step S8). The hardware processor 11 obtains information on the side edges of each line of the sheet in the read image on the basis of the difference in luminance or density between the background member 226 and the sheet, thereby identifying the sheet region in the read image.

Next, the hardware processor 11 obtains a correction value for the magnification of each subregion in the main scanning direction of each line of the sheet region in the read image by referring to the magnification correction table 161 (Step S9).

Next, the hardware processor 11 multiplies each of the obtained correction values by the correction coefficient received with the read image from the reading device 2, thereby adjusting the obtained correction values according to the temperature of the reader 22 (Step S10), and corrects the magnifications in the main scanning direction of the respective subregions of the sheet region in the read image on the basis of the respective adjusted correction values (Step S11). More specifically, the hardware processor 11 changes the magnification in the main scanning direction of each subregion such that the length in the main scanning direction of each subregion becomes one obtained by multiplying the length by its correction value.

Figure 8:
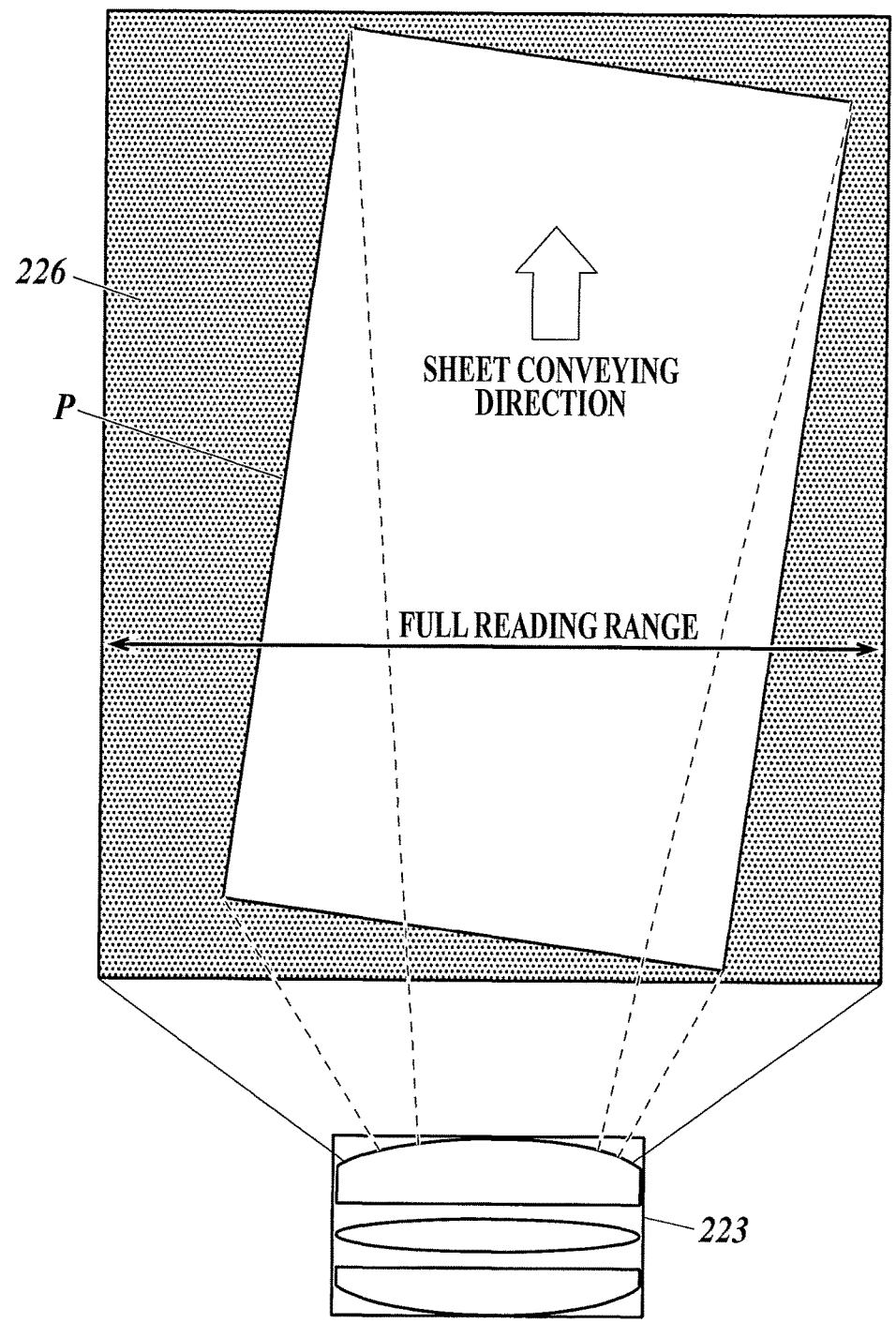
FIG. 8 schematically shows change in portions in the main scanning direction of a lens unit at the time of reading a skewed sheet, the portions being used to read the sheet.

Note that the hardware processor 11 identifies the sheet region in the read image and corrects the magnifications in the main scanning direction of the respective subregions of the identified sheet region. For example, as shown in FIG. 8, if positions of the side edges in the main scanning direction of a sheet read by the reader 22 gradually change from the top through the bottom of the sheet owing to a skew of the sheet, the hardware processor 11 changes the range in the main scanning direction to correct the sectional magnifications from the top through the bottom of the read image according to the change in the portions in the main scanning direction of the lens unit 223 used for the top through the bottom of the sheet, thereby performing magnification correction only on the range corresponding to the sheet region. Thus, magnification correction is performed only on the necessary range in the region of a read image, and accordingly processing time required for magnification correction of a read image(s) can be reduced.

Then, the hardware processor 11 identifies the positions of the register mark images in the sheet region in the read image and stores (updates) the positional information on the register mark images in the storage 16 (Step S12), and ends the processing in the adjustment mode.

At the time of an image forming job, the hardware processor 11 adjusts the image forming position in the image former 14 on the basis of the positional information on the register mark images stored in the storage 16 in the adjustment mode. For example, the hardware processor 11 adjusts timing of start of image writing.

Thus, in this embodiment, for the adjustment, the image forming system 100 identifies the sheet region in a read image obtained by the reading device 2 reading a sheet with register mark images formed, corrects magnifications of respective subregions in the main scanning direction of the sheet region on the basis of characteristics of portions in the main scanning direction of the lens unit 223, the portions having read the respective subregions, and then adjusts the image forming position on the basis of the corrected read image. Hence, difference in sectional magnifications in the main scanning direction of the sheet region in a read image(s), which is used for the adjustment of the image forming position, due to characteristics of the lens unit 223 can be appropriately corrected according to the conveyance state of the sheet. This can improve adjustment accuracy.

The adjustment mode is, before start of an image forming job, to adjust, on the basis of the conveyance state of a sheet(s) or the like, the image forming position and/or sectional magnifications of a read image(s), the sectional magnifications in which difference is generated owing to portions of the lens unit 223 of the reader 22, the portions having been used to obtain the read image(s). However, the conveyance state of a sheet(s) may change little by little during an image forming job. Hence, in this embodiment, a user can set execution or non-execution of real-time adjustment during an image forming job through the operational display 17. Hence, if emphasis is on quality of finished goods, real-time adjustment during an image forming job is available.

Figure 9:
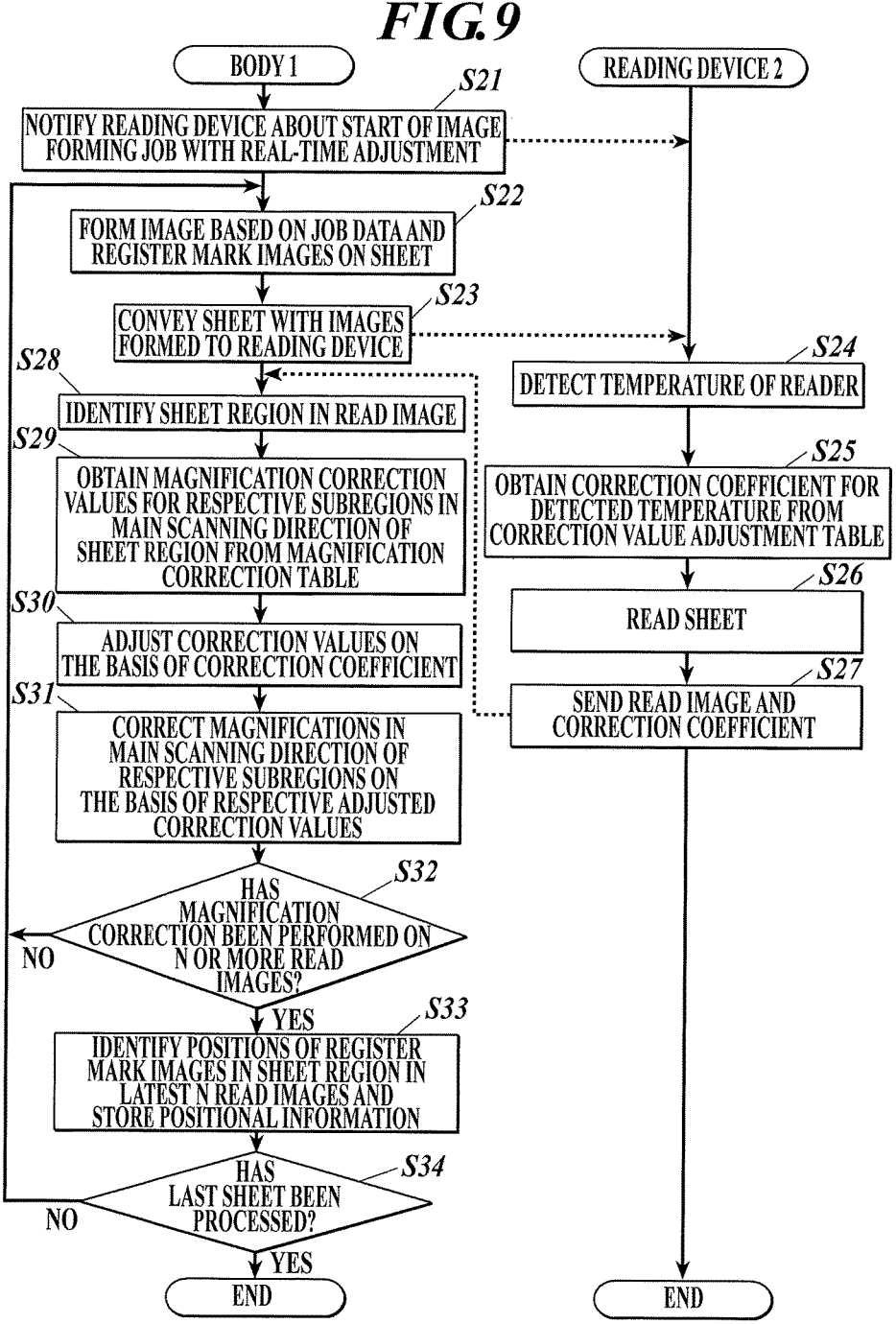
FIG. 9 shows flow of processing performed by the body and the reading device when an image forming job is performed in a state in which real-time adjustment is set in the first embodiment.

FIG. 9 is a flowchart showing the flow of processing performed by the body 1 and the reading device 2 when, on the operational display 17, real-time adjustment is set and then an image forming job is started, namely, the start button is pressed, or when an image forming job with real-time adjustment set is received through the communication unit 18. The process (steps) on the body 1 side shown in FIG. 9 is performed by the hardware processor 11 in cooperation with the program(s) stored in the storage 16, and the process (steps) on the reading device 2 side shown in FIG. 9 is performed by the hardware processor 21 in cooperation with the program(s) stored in the storage 24.

First, the hardware processor 11 notifies the reading device 2 about start of an image forming job with real-time adjustment through the communication I/F 19 (Step S21).

Next, the hardware processor 11 causes the sheet conveyor 15 to feed a sheet and causes the image former 14 to form an image based on the job data and register mark images on the sheet (Step S22). At the time, the hardware processor 11 adjusts the image forming position in the image former 14 on the basis of the positional information on register mark images stored in the storage 16. For example, the hardware processor 11 adjusts timing of start of image writing.

Next, the hardware processor 11 causes the sheet conveyor 15 to convey the sheet with the images formed to the reading device 2 (Step S23).

When receiving the sheet with the image based on the job data and the register mark images formed from the body 1 after receiving the notification of the start of the image forming job with real-time adjustment therefrom, the hardware processor 21 of the reading device 2 obtains a detection result of the temperature of the reader 22 from the temperature sensor 225 (Step S24), and obtains a correction coefficient for the surrounding temperature of the lens unit 223 by referring to the correction value adjustment table 241 stored in the storage 24 (Step S25).

Next, the hardware processor 21 of the reading device 2 causes the reader 22 to read the sheet, thereby obtaining a read image (Step S26), and sends the obtained read image and the correction coefficient obtained in Step S25 to the body 1 through the communication I/F 25 (Step S27). The read sheet is ejected to the paper output tray T by the sheet conveyor 23.

When receiving the read image and the correction coefficient through the communication I/F 19, the hardware processor 11 of the body 1 identifies the sheet region in the received read image (Step S28). The hardware processor 11 obtains information on the side edges of each line of the sheet in the read image on the basis of the difference in luminance or density between the background member 226 and the sheet, thereby identifying the sheet region in the read image.

Next, the hardware processor 11 obtains a correction value for the magnification of each subregion in the main scanning direction of each line of the sheet region in the read image by referring to the magnification correction table 161 (Step S29).

Next, the hardware processor 11 multiplies each of the obtained correction values by the correction coefficient received with the read image from the reading device 2, thereby adjusting the obtained correction values according to the temperature of the reader 22 (Step S30), and corrects the magnifications in the main scanning direction of the respective subregions of the sheet region in the read image on the basis of the respective adjusted correction values (Step S31). More specifically, the hardware processor 11 changes the magnification in the main scanning direction of each subregion such that the length in the main scanning direction of each subregion becomes one obtained by multiplying the length by its correction value.

Next, the hardware processor 11 determines whether magnification correction has been performed on N or more read images (wherein "N" is a positive integer) (Step S32). When determining that magnification correction has not been performed on N or more read images yet (Step S32; NO), the hardware processor 11 returns to Step S22.

On the other hand, when determining that magnification correction has been performed on N or more read images (Step S32; YES), the hardware processor 11 identifies the positions of the resister mark images in the sheet region in each of the most-recently-processed (i.e. latest) N read images, calculates the mean value (moving average) of the positional information on the register mark images of the N read images, and stores (updates) the positional information (the mean value/moving average) in the storage 16 (Step S33).

Next, the hardware processor 11 determines whether image forming has been performed on the last sheet of the image forming job (Step S34).

When determining that image forming has not been performed on the last sheet of the image forming job yet (Step S34; NO), the hardware processor 11 returns to Step S22 and repeats Steps S22 to S34.

On the other hand, when determining that image forming has been performed on the last sheet of the image forming job (Step S34; YES), the hardware processor 11 ends the image forming job.

Thus, the image forming system 100 corrects sectional magnifications in the main scanning direction of a read image(s) on the basis of characteristics of portions in the main scanning direction of the lens unit 223 and adjusts the image forming position or the like on the basis of the corrected read image(s) in real time during an image forming job(s). This can further improve adjustment accuracy.

Second Embodiment

Next, a second embodiment of the present invention is described.

Although the body 1 corrects a read image(s) obtained by the reading device 2 in the first embodiment, the reading device 2 corrects a read image(s) obtained thereby in the second embodiment.

In the second embodiment, the storage 16 of the body 1 stores therein programs to perform the processes (steps) on the body 1 side shown in FIG. 10 and FIG. 11, and the storage 24 of the reading device 2 stores therein programs to perform the processes (steps) on the reading device 2 side shown in FIG. 10 and FIG. 11, the magnification correction table 161 and the correction value adjustment table 241.

Except for the above, the configuration of the image forming system 100 is the same as that described in the first embodiment, and hence description thereof is not repeated here. Hereinafter, operation of the image forming system 100 according to the second embodiment is described.

FIG. 10 is a flowchart showing the flow of processing performed by the body 1 and the reading device 2 when the adjustment mode is selected and the start button is pressed on the operational display 17. The process (steps) on the body 1 side shown in FIG. 10 is performed by the hardware processor 11 in cooperation with the program(s) stored in the storage 16, and the process (steps) on the reading device 2 side shown in FIG. 10 is performed by the hardware processor 21 in cooperation with the program(s) stored in the storage 24.

First, the hardware processor 11 notifies the reading device 2 about start of the adjustment mode through the communication I/F 19 (Step S41).

Next, the hardware processor 11 causes the sheet conveyor 15 to feed a sheet and causes the image former 14 to form register mark images on the sheet (Step S42).

Next, the hardware processor 11 causes the sheet conveyor 15 to convey the sheet with the register mark images formed to the reading device 2 (Step S43).

When receiving the sheet with the register mark images formed from the body 1 after receiving the notification of the start of the adjustment mode therefrom, the hardware processor 21 of the reading device 2 obtains a detection result of the temperature of the reader 22 from the temperature sensor 225 (Step S44), and obtains a correction coefficient for the surrounding temperature of the lens unit 223 by referring to the correction value adjustment table 241 stored in the storage 24 (Step S45).

Next, the hardware processor 21 of the reading device 2 causes the reader 22 to read the sheet, thereby obtaining a read image (Step S46). The read sheet is ejected to the paper output tray T by the sheet conveyor 23.

Next, the hardware processor 21 identifies the sheet region in the read image obtained by the reader 22 (Step S47). The hardware processor 21 obtains information on the side edges of each line of the sheet in the read image on the basis of the difference in luminance or density between the background member 226 and the sheet, thereby identifying the sheet region in the read image.

Next, the hardware processor 21 obtains a correction value for the magnification of each subregion in the main scanning direction of each line of the sheet region in the read image by referring to the magnification correction table 161 (Step S48).

Next, the hardware processor 21 multiplies each of the obtained correction values by the correction coefficient obtained in Step S45, thereby adjusting the obtained correction values according to the temperature of the reader 22 (Step S49), and corrects the magnifications in the main scanning direction of the respective subregions of the sheet region in the read image on the basis of the respective adjusted correction values (Step S50). More specifically, the hardware processor 21 changes the magnification in the main scanning direction of each subregion such that the length in the main scanning direction of each subregion becomes one obtained by multiplying the length by its correction value.

Then, the hardware processor 21 sends the read image with the magnifications in the main scanning direction corrected to the body 1 through the communication I/F 25 (Step S51).

When receiving the read image from the reading device 2 through the communication I/F 19, the hardware processor 11 of the body 1 identifies the positions of the register mark images in the sheet region in the read image and stores (updates) the positional information on the register mark images in the storage 16 (Step S52), and ends the processing in the adjustment mode.

At the time of an image forming job, the hardware processor 11 adjusts the image forming position in the image former 14 on the basis of the positional information on the register mark images stored in the storage 16 in the adjustment mode. For example, the hardware processor 11 adjusts timing of start of image writing.

Thus, in this embodiment, for the adjustment, the image forming system 100 corrects magnifications of respective subregions in the main scanning direction of a read image obtained by the reading device 2 reading a sheet with register mark images formed, on the basis of characteristics of portions in the main scanning direction of the lens unit 223, the portions having read the respective subregions, and then adjusts the image forming position on the basis of the corrected read image. This can improve adjustment accuracy.

Next, the real-time adjustment in the second embodiment is described.

FIG. 11 is a flowchart showing the flow of processing performed by the body 1 and the reading device 2 when, on the operational display 17, real-time adjustment is set and then an image forming job is started, namely, the start button is pressed, or when an image forming job with real-time adjustment set is received through the communication unit 18. The process (steps) on the body 1 side shown in FIG. 11 is performed by the hardware processor 11 in cooperation with the program(s) stored in the storage 16, and the process (steps) on the reading device 2 side shown in FIG. 11 is performed by the hardware processor 21 in cooperation with the program(s) stored in the storage 24.

First, the hardware processor 11 notifies the reading device 2 about start of an image forming job with real-time adjustment through the communication I/F 19 (Step S61).

Next, the hardware processor 11 causes the sheet conveyor 15 to feed a sheet and causes the image former 14 to form an image based on the job data and register mark images on the sheet (Step S62). At the time, the hardware processor 11 adjusts the image forming position in the image former 14 on the basis of the positional information on register mark images stored in the storage 16. For example, the hardware processor 11 adjusts timing of start of image writing.

Next, the hardware processor 11 causes the sheet conveyor 15 to convey the sheet with the images formed to the reading device 2 (Step S63).

When receiving the sheet with the image based on the job data and the register mark images formed from the body 1 after receiving the notification of the start of the image forming job with real-time adjustment therefrom, the hardware processor 21 of the reading device 2 obtains a detection result of the temperature of the reader 22 from the temperature sensor 225 (Step S64), and obtains a correction coefficient for the surrounding temperature of the lens unit 223 by referring to the correction value adjustment table 241 stored in the storage 24 (Step S65).

Next, the hardware processor 21 of the reading device 2 causes the reader 22 to read the sheet, thereby obtaining a read image (Step S66). The read sheet is ejected to the paper output tray T by the sheet conveyor 23.

Next, the hardware processor 21 identifies the sheet region in the read image obtained by the reader 22 (Step S67). The hardware processor 21 obtains information on the side edges of each line of the sheet in the read image on the basis of the difference in luminance or density between the background member 226 and the sheet, thereby identifying the sheet region in the read image.

Next, the hardware processor 21 obtains a correction value for the magnification of each subregion in the main scanning direction of each line of the sheet region in the read image by referring to the magnification correction table 161 (Step S68).

Next, the hardware processor 21 multiplies each of the obtained correction values by the correction coefficient obtained in Step S65, thereby adjusting the obtained correction values according to the temperature of the reader 22 (Step S69), and corrects the magnifications in the main scanning direction of the respective subregions of the sheet region in the read image on the basis of the respective adjusted correction values (Step S70). More specifically, the hardware processor 21 changes the magnification in the main scanning direction of each subregion such that the length in the main scanning direction of each subregion becomes one obtained by multiplying the length by its correction value. Then, the hardware processor 21 sends the read image with the magnifications corrected to the body 1 through the communication I/F 25 (Step S71).

When receiving the read image from the reading device 2, the hardware processor 11 determines whether N or more read images (wherein "N" is a positive integer) have been received from the reading device 2 during the image forming job (Step S72).

When determining that N or more read images have not been received from the reading device 2 yet (Step S72; NO), the hardware processor 11 returns to Step S62.

On the other hand, when determining that N or more read images have been received from the reading device 2 (Step S72; YES), the hardware processor 11 identifies the positions of the resister mark images in the sheet region in each of the latest N read images, calculates the mean value (moving average) of the positional information on the register mark images of the N read images, and stores (updates) the positional information (the mean value/moving average) in the storage 16 (Step S73).

Next, the hardware processor 11 determines whether image forming has been performed on the last sheet of the image forming job (Step S74).

When determining that image forming has not been performed on the last sheet of the image forming job yet (Step S74; NO), the hardware processor 11 returns to Step S62 and repeats Steps S62 to S74.

On the other hand, when determining that image forming has been performed on the last sheet of the image forming job (Step S74; YES), the hardware processor 11 ends the image forming job.

Thus, the image forming system 100 corrects sectional magnifications in the main scanning direction of a read image(s) on the basis of characteristics of portions in the main scanning direction of the lens unit 223 and adjusts the image forming position or the like on the basis of the corrected read image(s) in real time during an image forming job(s). This can further improve adjustment accuracy.

As described above, according to the image forming system 100, the hardware processor 11 or the hardware processor 21 identifies the sheet region in a read image(s) obtained by the CCD line sensor 224 reading a sheet(s) with an image(s) formed by the body 1, and corrects magnifications of respective subregions in the main scanning direction of the identified sheet region according to characteristics of portions in the main scanning direction of the lens unit 223, the portions having been used in forming images of the respective subregions on the CCD line sensor 224.

Hence, difference in magnifications of respective subregions in the main scanning direction of the sheet region in a read image(s) due to characteristics of the lens unit 223 can be appropriately corrected according to the conveyance state of the sheet(s). Further, magnification correction is performed only on the sheet region in a read image(s), i.e. not performed on the outside of the sheet region. Hence, processing time therefor can be reduced.

For example, if positions of the side edges in the main scanning direction of the sheet read by the reader 22 gradually change from the top through the bottom of the sheet owing to a skew of the sheet, the hardware processor 11 or the hardware processor 21 changes the range in the main scanning direction to correct the magnifications from the top through the bottom of the read image according to the change in the portions in the main scanning direction of the lens unit 223 used for the top through the bottom of the sheet. Hence, even when a sheet is skewed, difference in magnifications of respective subregions in the main scanning direction of the sheet region in the read image can be appropriately corrected.

Further, the temperature sensor 225 that detects temperature of the reading device 2 is provided, and the hardware processor 11 or the hardware processor 21 adjusts correction amounts for the respective magnifications on the basis of the temperature of the reading device 2 detected by the temperature sensor 225 at the time of reading of the sheet. Hence, even when the lens unit 223 expands and magnifications in the main scanning direction of a read image(s) change owing to change in the temperature in the reading device 2 resulting from reading a sheet(s) having been subjected to heat fixing, the magnifications can be appropriately corrected according to the temperature of the reading device 2.

Further, the hardware processor 11 or the hardware processor 21 identifies the sheet region in the read image on the basis of the difference in luminance or density between the sheet and the background in the read image. Hence, the sheet region in a read image(s) can be easily found.

Further, the hardware processor 11 adjusts the image forming position in the image former 14 on the basis of the read image with difference in the sectional magnifications in the main scanning direction corrected, the read image being obtained by the CCD line sensor 224 reading the sheet with resister mark images formed. Hence, the image forming position can be adjusted with high accuracy.

The descriptions in the above embodiments are merely preferred examples of the image forming system and the reading device of the present invention, and hence the present invention is not limited thereto.

For example, in the above embodiments, the present invention is applied to magnification correction of a read image(s) obtained by the reading device 2, which reads a sheet(s) with an image(s) formed by the body 1, but not limited thereto. For example, the present invention is also applicable to magnification correction of a read image(s) obtained by the scanner 12b, which scans a document(s), of the body 1. That is, the hardware processor 11 as a magnification correction unit may perform magnification correction on a read image(s) obtained by the scanner 12b in the same manner as that described in the above embodiments. Further, the present invention is also applicable to a read-only reading device (scanner device) that does not have, of the components of the body 1, the image former 14.

Further, in the above embodiments, the image forming system has the body 1 and the reading device 2. However, a post-processing device may be disposed downstream of the reading device 2 in the sheet conveying direction so that sheets can be subjected to cutting, folding, binding, punching and/or the like.

Further, in the above, as a computer readable medium of the programs of the present invention, a ROM, a nonvolatile memory, a hard disk or the like is used as an example. However, this is not a limitation. As the computer readable medium, a portable storage medium, such as a CD-ROM, can also be used. Further, as a medium to provide data of the programs of the present invention, a carrier wave can be used.

In addition to the above, detailed configurations and detailed operations of the image forming system and the reading device can also be appropriately modified without departing from the spirit of the present invention.

Although embodiments of the present invention have been described and illustrated in detail, it is clearly understood that the same is by way of illustration and example only and is not to be taken by way of limitation, and the scope of the present invention should be interpreted by terms of the appended claims.

What is claimed is:

1. An image forming system comprising:
    an image forming device including an image former that forms an image on a sheet; and
    a reading device including:
        a line sensor that reads the sheet with the image formed by the image forming device, thereby obtaining a read image; and
        a lens unit including a plurality of lenses that forms an image of the sheet on the line sensor; and
    a first hardware processor that:
        identifies a sheet region of the sheet in the read image obtained by the line sensor; and
        corrects a magnification of each subregion in a main scanning direction of the identified sheet region according to a characteristic of the lens unit that is used in forming an image of the subregion in the main scanning direction on the line sensor.

2. The image forming system according to claim 1, wherein if a position of a side edge in the main scanning direction of the sheet read by the reading device gradually changes from a top through a bottom of the sheet owing to a skew of the sheet, the first hardware processor changes a range in the main scanning direction to correct the magnification from the top through the bottom of the read image according to change in the main scanning direction of the lens unit used for the top through the bottom of the sheet.

3. The image forming system according to claim 1, further comprising a temperature detector that detects a temperature of the reading device, wherein
    the first hardware processor adjusts a correction amount for the magnification based on the temperature of the reading device detected by the temperature detector at a time of reading of the sheet.

4. The image forming system according to claim 1, wherein the first hardware processor identifies the sheet region in the read image based on a difference in luminance or density between the sheet and a background in the read image.

5. The image forming system according to claim 1, wherein
    the image forming device is provided with the first hardware processor,
    the reading device sends the read image to the image forming device, and
    the first hardware processor corrects the magnification with respect to the read image sent from the reading device.

6. The image forming system according to claim 1, wherein
    the reading device is provided with the first hardware processor, and
    the reading device sends the read image with the magnification corrected by the first hardware processor to the image forming device.

7. The image forming system according to claim 1, wherein
    the image former forms, on the sheet, a position adjustment image to adjust a position of an image to be formed on a sheet,
    the image forming device is provided with a second hardware processor that adjusts the position of an image to be formed on a sheet in the image former based on the read image with the magnification corrected by the first hardware processor of the sheet with the position adjustment image formed, and the second hardware processor is identical with or different from the first hardware processor.

8. The image forming system according to claim 1, wherein the first hardware processor is configured to control timing of image writing in the main scanning direction in accordance with the corrected magnification of each subregion.

9. A reading device comprising:
a line sensor that reads a sheet with an image formed, thereby obtaining a read image;
a lens unit including a plurality of lenses that forms an image of the sheet on the line sensor; and
a hardware processor that:
identifies a sheet region of the sheet in the read image obtained by the line sensor; and
corrects a magnification of each subregion in a main scanning direction of the identified sheet region according to a characteristic of the lens unit that is used in forming an image of the subregion in the main scanning direction on the line sensor.

10. The reading device according to claim 9, wherein if a position of a side edge in the main scanning direction of the sheet read by the reading device gradually changes from a top through a bottom of the sheet owing to a skew of the sheet, the hardware processor changes a range in the main scanning direction to correct the magnification from the top through the bottom of the read image according to change in the portion in the main scanning direction of the lens unit used for the top through the bottom of the sheet.

11. The reading device according to claim 9, further comprising a temperature detector that detects a temperature of the reading device, wherein
the hardware processor adjusts a correction amount for the magnification based on the temperature detected by the temperature detector at a time of reading of the sheet.

12. The reading device according to claim 9, wherein the hardware processor identifies the sheet region in the read image based on a difference in luminance or density between the sheet and a background in the read image.

13. The reading device according to claim 9, wherein the first hardware processor is configured to control timing of image writing in the main scanning direction in accordance with the corrected magnification of each subregion.

* * * * *